(12) United States Patent
Curle et al.

(10) Patent No.: US 11,787,069 B2
(45) Date of Patent: Oct. 17, 2023

(54) INSERTION TOOL WITH FLEXIBLE SPINE

(71) Applicant: OLIVER CRISPIN ROBOTICS LIMITED, Altrincham (GB)

(72) Inventors: Jason Ralph Gordon Curle, Wotton-Under-Edge (GB); Peter John Nisbet, Bristol (GB); Tim Henri Ann Francois, Emerson's Green (GB)

(73) Assignee: Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 17/693,126

(22) Filed: Mar. 11, 2022

(65) Prior Publication Data

US 2023/0139801 A1 May 4, 2023

Related U.S. Application Data (60) Provisional application No. 63/274,421, filed on Nov. 1, 2021.

(51) Int. Cl.
*B25J 18/06* (2006.01)
*B25J 9/06* (2006.01)
(Continued)

(52) U.S. Cl.
CPC ............... *B25J 18/06* (2013.01); *B25J 9/06* (2013.01); *B25J 9/1045* (2013.01); *B25J 19/007* (2013.01)

(58) Field of Classification Search
CPC . B25J 19/007; B25J 9/1045; B25J 9/06; B25J 18/06
See application file for complete search history.

(56) References Cited

U.S. PATENT DOCUMENTS 2,574,657 A * 11/1951 Pierce ..................... F16G 13/20
254/98
5,662,587 A    9/1997 Grundfest et al.
(Continued)

FOREIGN PATENT DOCUMENTS

EP    2375104    10/2011
EP    3786630    3/2021
(Continued)

OTHER PUBLICATIONS

USPTO, Unpublished U.S. Appl. No. 17/219,577, filed Mar. 31, 2021, entitled "Extension Tool".
(Continued)

*Primary Examiner* — David M Fenstermacher
(74) *Attorney, Agent, or Firm* — Fitch, Even, Tabin & Flannery, LLP (57) ABSTRACT

An insertion tool with a flexible spine and a method for forming thereof are provided. A method includes placing a plurality of links, a flexible spine, and a line assembly into a channel of a fixturing assembly, pulling, via the line assembly, the plurality of links into a tensioned state in the channel, and affixing the flexible spine to each of the plurality of links while in the tensioned state. An insertion tool comprising a plurality of links arranged in a sequence, a flexible spine affixed to three or more links of the plurality of links, and a line assembly inserted through line guides in each of the plurality of links, the line assembly being configured to actuate the plurality of links from a free state to a tensioned state.

20 Claims, 10 Drawing Sheets

(51) Int. Cl.
   *B25J 9/10*         (2006.01)
   *B25J 19/00*        (2006.01)

(56) References Cited

U.S. PATENT DOCUMENTS

| | | | |
|---|---|---|---|
| 7,154,362 | B2 | 12/2006 | Ohnstein et al. |
| 8,768,509 | B2 | 7/2014 | Unsworth |
| 9,016,159 | B2 | 4/2015 | Kell et al. |
| 9,393,702 | B2* | 7/2016 | Kim ................ B25J 9/104 |
| 9,482,313 | B2* | 11/2016 | Saji ................ B66F 3/06 |
| 9,897,180 | B2* | 2/2018 | Hartinger ............ F16G 13/20 |
| 9,993,308 | B2* | 6/2018 | Lee ................ A61B 34/30 |
| 10,080,576 | B2 | 9/2018 | Romo et al. |
| 10,589,434 | B2* | 3/2020 | Voisembert ........... B25J 18/06 |
| 10,670,113 | B2* | 6/2020 | Yoon ................ B25J 18/02 |
| 10,772,694 | B2* | 9/2020 | Ishihara ............. A61B 34/71 |
| 10,800,046 | B2* | 10/2020 | Yoon ................ B25J 18/02 |
| 10,800,047 | B2* | 10/2020 | Yoon ................ F16H 19/0645 |
| 10,967,504 | B2 | 4/2021 | Simaan et al. |
| 11,148,303 | B2 | 10/2021 | Norton |
| 11,235,476 | B2* | 2/2022 | Amemiya ............ F16G 13/20 |
| 11,279,048 | B2* | 3/2022 | Imasaka ............. F16G 13/20 |
| 11,377,162 | B2* | 7/2022 | Ding ................ F03G 7/065 |
| 11,454,304 | B2* | 9/2022 | Wolf ................ F16H 19/0636 |
| 11,530,735 | B2* | 12/2022 | Seigneur ............ E05F 11/00 |
| 11,543,017 | B2* | 1/2023 | Zhou ................ F16H 57/021 |
| 2016/0375591 | A1 | 12/2016 | Yoon |
| 2018/0361597 | A1 | 12/2018 | Yoon |
| 2019/0360794 | A1 | 11/2019 | Graham et al. |
| 2020/0188042 | A1 | 6/2020 | Dong et al. |
| 2021/0129358 | A1 | 5/2021 | Amemiya |
| 2021/0285374 | A1 | 9/2021 | Hawke et al. |
| 2022/0221706 | A1* | 7/2022 | Trivedi ............. A61B 1/00078 |

FOREIGN PATENT DOCUMENTS

| | | |
|---|---|---|
| EP | 3879075 | 9/2021 |
| JP | H05277982 | 10/1993 |
| WO | 201645658 A1 | 3/2016 |

OTHER PUBLICATIONS

USPTO, Unpublished U.S. Appl. No. 17/552,848, filed Dec. 16, 2021, entitled "System and Method of Adjusting a Tool".

* cited by examiner

INSERTION TOOL WITH FLEXIBLE SPINE

This application claims the benefit of U.S. Provisional Application No. 63/274,421 filed Nov. 1, 2021, which is incorporated herein by reference in its entirety

FIELD OF THE DISCLOSURE

The present subject matter relates generally to tools for inspecting an environment and/or performing maintenance operations on a component within the environment, and methods for forming thereof.

BACKGROUND

Snake-arm robots are highly flexible robots suited for working in confined and hazardous spaces. Driven by wire ropes, snake-arm robots are able to traverse cluttered environments and conduct activities such as inspection, fastening, and cleaning when integrated with various tools.

Guide tubes are typically cylindrical pathways used to direct a variety of tools and fasteners. Guide tubes may be installed to ensure accuracy and precision during a secondary process.

BRIEF DESCRIPTION OF THE DRAWINGS

Various needs are at least partially met through provision of the INSERTION TOOL WITH FLEXIBLE SPINE described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present subject matter relates to an insertion tool and a method of forming thereof. The tool may be used for inspecting an environment (e.g., inspecting internal components with the tool to produce images) and/or performing maintenance operations. In some embodiments, the tool may comprise a snake arm robot and/or a rigidizable guiding tool. In some embodiments, the tool may be useful in inspecting and performing maintenance on machinery with narrow channels such as a gas turbine engine.

In some embodiments, the devices and methods described herein replace the prior art connectors (e.g. hinge pins or other sliding or pivoting features) in guide tubes and other circumferential tools like an arc-snake with a flexible spine to connect the links of the tool. In some embodiments, an insertion tool with a flexible spine described herein improves the correct positing of the tool in a combustor compared to guide tubes with individual hinges between links. In some embodiments, the spine and the body may be fixed together through a direct fixing method or by using an additional core in one of the bodies. Methods to fix may include bonding, welding, screws, rivets, crimping, encapsulation within one or more bodies, overmolding, brazing, shrink fits, heating staking, fastening (e.g. with spins or screws), and snap fits. In some embodiments, the spine may be integrated with the body and formed from a single material, such as through an additive manufacturing process that forms both the spine and one or more links through depositing layers of material in a specific sequence based on a computer model.

In some embodiments, the devices and methods described herein provide robustness for manually operated rigidizable guide tubes and snake-arm robots, at a low price. In some embodiments, the devices and methods may generally be used for slender manipulators with a high number of degrees of freedom that allows the device to be inserted along a path or around an obstacle. The device has been shown to be effective in prototype form and addresses both cost and robustness issues with other hinge designs in a number of robotics products. The teachings described herein are applicable to rigidizable guide tubes and planar snake-arm robots. Lowering the costs of advanced inspection devices can greatly increase the adoption rates of the advanced inspection devices in the field, allowing the manufacturer/servicer to see more data from product lines.

In some embodiments, individual hinges of a guide tube are replaced with a single flexible spine or multiple short spine strips between the links. The design is relatively economical to produce in long lengths which keeps the costs of longer devices down and helps to expand potential opportunities to deploy.

In some embodiments, the use of the spine removes the requirement to hold the joint stable to maintain a high torsional stiffness and maintain accuracy compared to existing designs, allowing devices to be made smaller and therefore access more areas. As the spine removes the need to hold a force across the joint between the bodies, a force is only needed to form the body into a shape rather than hold it together, increasing the robustness of the device. In some embodiments, the use of a flexible spine also allows a desired shape of the insertion tool to be achieved without having to tolerance each component very highly.

In some embodiments, a fixed arc or other datum surface is used during fixturing/assembly of the insertion tool. The fixturing channel comprising a fixed arc or datum may substantially increase the accuracy of the device without complex secondary manufacturing operations or forcing high-cost precision manufacturing techniques for constituent parts. In some embodiments, a rigidizable guide tube with a flexible spine may include fewer tension ropes/lines to simplify the assembly process and control during deployment.

In some embodiments, in an insertion tool, a pair of links are allowed to move about an axis relative to each other without a sliding or rotating pivot using a flexure hinge/flexible spine. During manufacture, the final shape of the arm may be constrained in a fixture during fixing of the flexible spine to the arm to ensure that the final form of the device is accurate and independent of the sum totals of errors in the individual links.

In some embodiments, a method includes placing a plurality of links, a flexible spine, and a line assembly into a channel of a fixturing assembly, the line assembly being inserted through line guides in each of the plurality of links. The method also includes pulling, via the line assembly, the plurality of links into a tensioned state in the channel. The method also includes affixing the flexible spine to each of the plurality of links in the channel and while in the tensioned state.

In some embodiments, an insertion tool apparatus includes a plurality of links arranged in a sequence and a flexible spine affixed to the plurality of links. The apparatus also includes a line assembly inserted through line guides in each of the plurality of links, the line assembly being configured to actuate the plurality of links from a free state to a tensioned state.

Figure 1A:
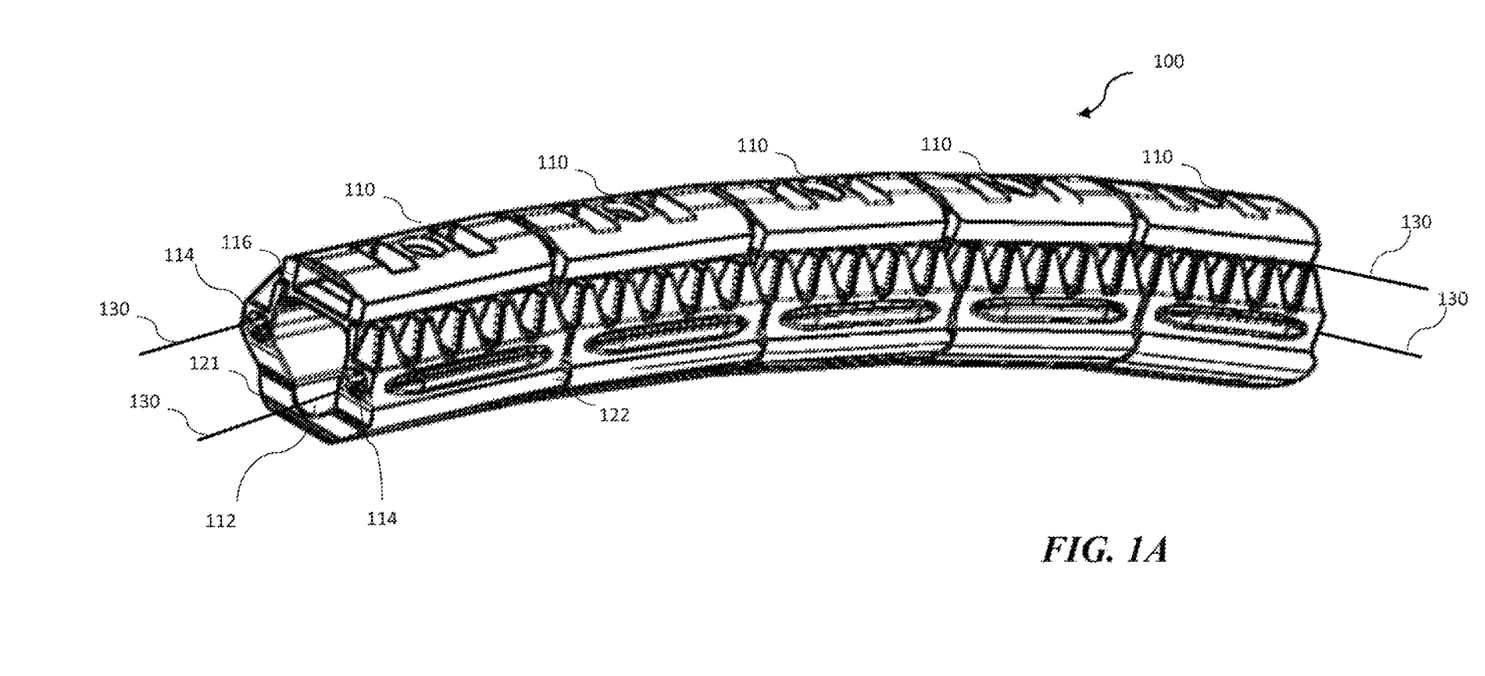
FIG. 1A is a perspective view of a portion of an insertion tool in a tensioned state according to some embodiments.
Figure 1B:
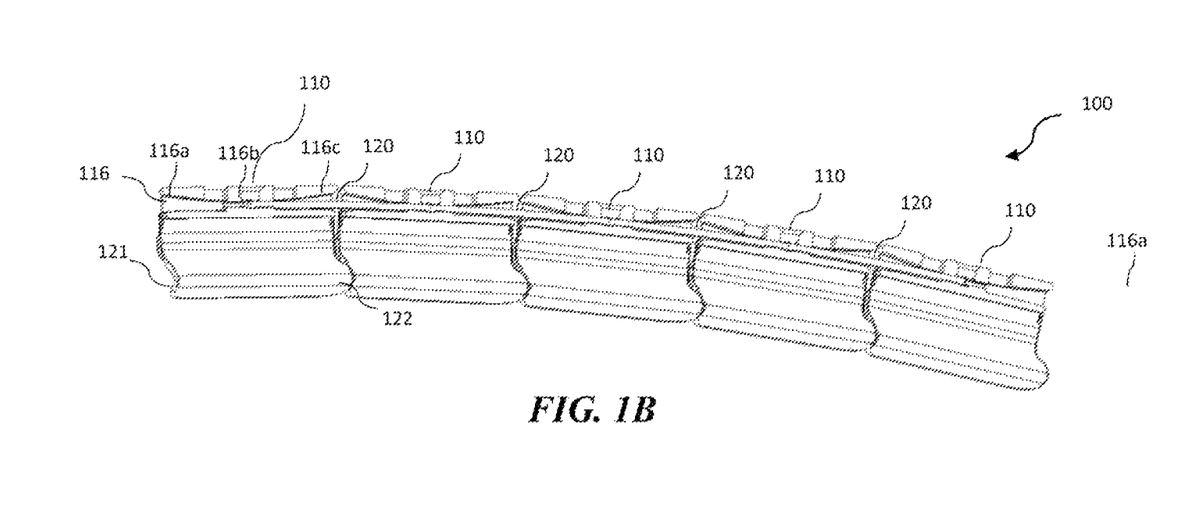
FIG. 1B is a section view of the portion of the insertion tool of FIG. 1A according to some embodiments.
Figure 1C:
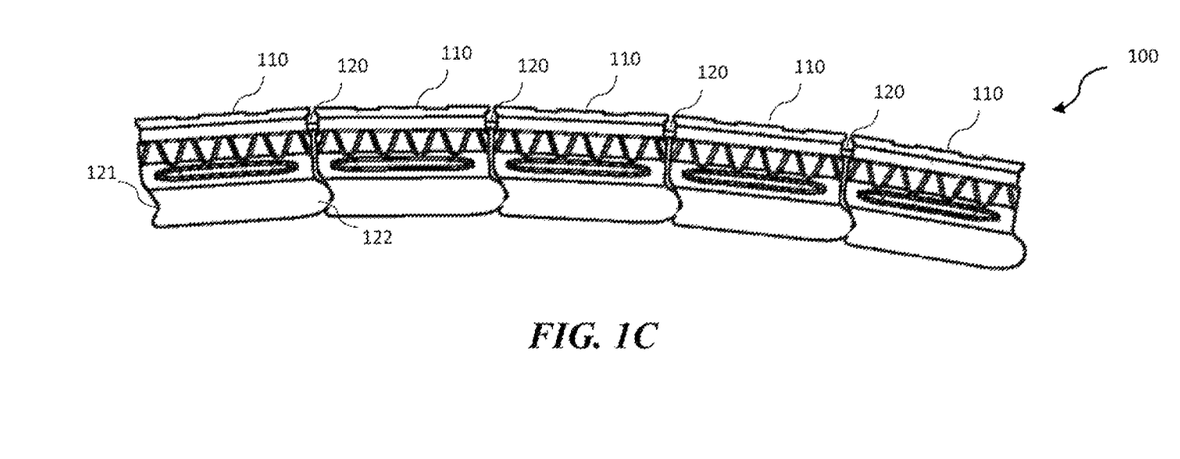
FIG. 1C is a side view of the portion of the insertion tool of FIG. 1A according to some embodiments.
Figure 2A:
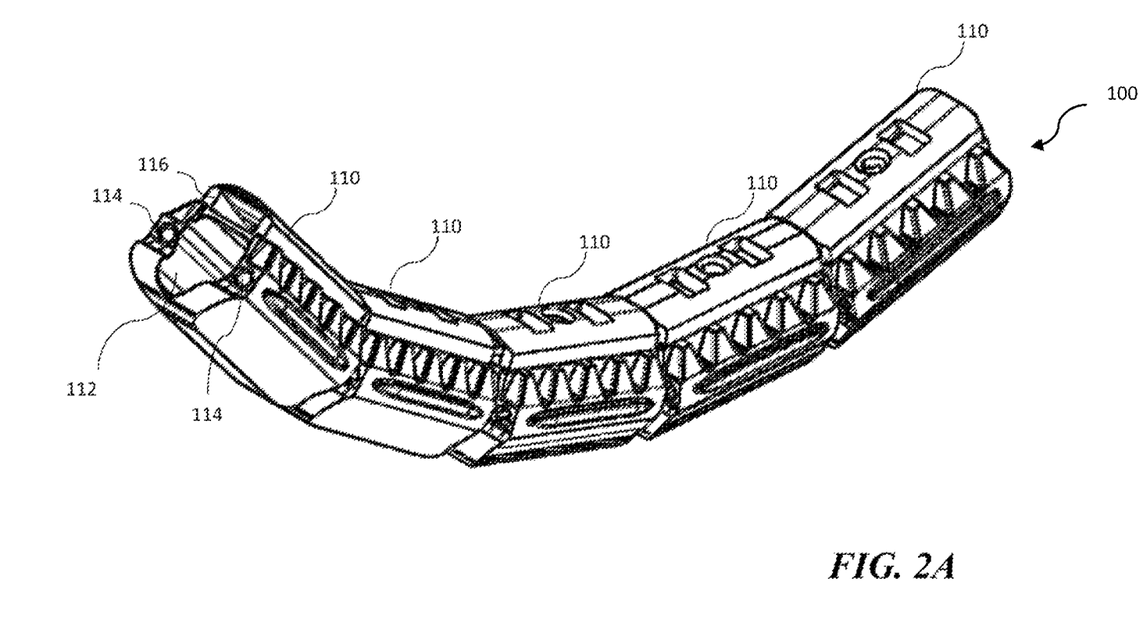
FIG. 2A is a perspective view of the portion of the insertion tool of FIG. 1A in a bent position according to some embodiments.
Figure 2B:
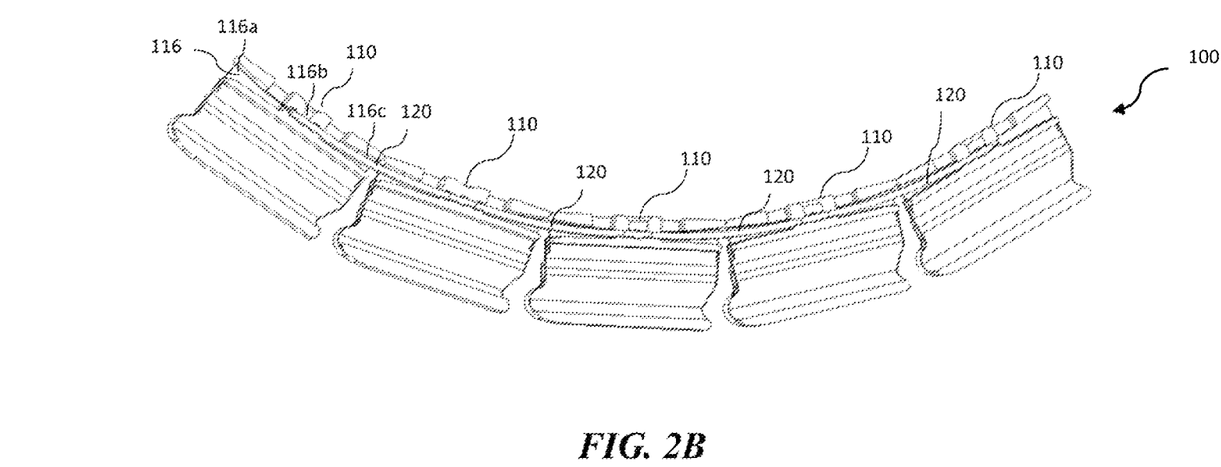
FIG. 2B is a section view of the portion of the insertion tool of FIG. 2A according to some embodiments.
Figure 2C:
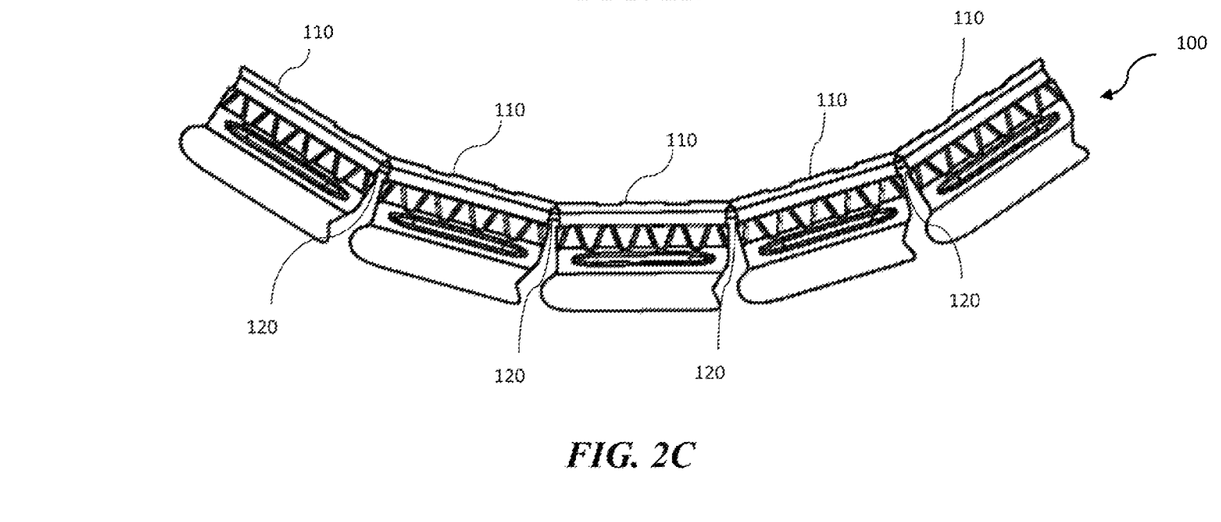
FIG. 2C is a side view of the portion of the insertion tool of FIG. 2A according to some embodiments.

The foregoing and other benefits may become clearer upon making a thorough review and study of the following detailed description. Referring now to the drawings, wherein identical numerals indicate the same elements throughout the figures. In FIG. 1A, a perspective view of a portion of an insertion tool 100 in a tensioned state is provided. FIGS. 1B and 1C are views of the insertion tool 100 in section view and side view respectively. FIGS. 2A, 2B, 2C illustrates the insertion tool 100 in a bend position in a perspective view, section view, and side view respectively. In some embodiments, the insertion tool 100 may comprise a snake arm robot and/or a rigidizable guiding tool. In some embodiments, the insertion tool 100 comprises a distal end configured to reach into narrow areas, such as the interior of a turbine engine, while being manipulated from a proximal end. In some embodiments, service and inspection tools such as clamps, cameras, cleaning tools, etc. may be attached to the distal end of an insertion tool 100 to perform various functions while the insertion tool 100 is inserted. In some embodiments, the proximal end of the insertion tool 100 may be mounted to a control system, such as a gear rack, for controlling the movement of the insertion tool 100. In some embodiments, the proximal end may further include a tension controller for affecting the tension of a tension line assembly 130 inserted through the links 110 of the insertion tool 100. The insertion tool 100 may be actuated between a tensioned state and a free state via the tension line assembly 130.

The insertion tool 100 includes a plurality of links 110 arranged in sequence from the proximal end to the distal end of the insertion tool 100. The links 110 may each include an interior opening that collectively defines a core 112 through the links 110 for supporting and enabling the operation of a wide variety of service and/or inspection tool implements through the links 110. In some embodiments, each link 110 may be formed of molded plastic, additively manufactured plastic, overmolded plastic, metal, etc. The interior of the links 110 further includes a spine slot 116 for the placement of a flexible spine 120 that connects two or more links 110. In some embodiments, as shown in FIGS. 1B and 2B, the spine slots 116 in links 110 may be narrower in the center 116b and wider towards the two ends 116a and 116c of a link 110 to allow flex of the flexible spine 120. In some embodiments, the flexible spine 120 may be affixed to one or more links 110 via bonding, welding, heat staking, fasteners (e.g. pins, screws), snap fits, over-molding, brazing, shrink fits, and the like. In some embodiments, the flexible spine 120 may be affixed to the link 110 at or near the center of the spine slot 116. In some embodiments, a flexible spine 120 may instead be affixed to an exterior or interior surface of links 110 without a spine slot 116. In some embodiments, a polymer or other moldable material may be molded over the links 110 and the flexible spine 120 or parts thereof. In some embodiments, links 110 may be molded in place on the flexible spines. In some embodiments, the insertion tool 100 may be formed by shaping and affixing the links 110 to the flexible spine 120 according to the method described with reference to FIG. 5.

In some embodiments, the flexible spine 120 may be a continuous piece of material that extends through all links 110 of an insertion tool 100. In some embodiments, the flexible spine 120 may include a plurality of segments with each segment being a continuous piece of material that is affixed to two, three, four, or more links 110 of the insertion tool 100. Generally, the flexible spine 120 is one or more strips or rods of material without any joints or pivots. In some embodiments, the flexible spine 120 may be formed of metal, spring steel, plastic, carbon fiber, woven Kevlar, or other high tensile material. In some embodiments, the flexible spine 120 may have an elastic modulus of between 5-210 MPa. In some embodiments, the flexible spine 120 is configured to secure the links 110 together while allowing the links 110 to pivot relative to each other when tension or external bending force is applied. In some embodiments, the flexible spine 120 is shaped to provide one degree of freedom to the movement of the tip of the insertion tool 100 and prevent axial rotation of the links 110 relative to each other. In some embodiments, the flexible spine 120 may be a flat strip to limit the rotation of the links 110 relative to each other. In some embodiments, the flexible spine 120 and the shape of the links 110 are configured to limit the bend of the insertion tool 100 in one or both directions The links 110 further include line guides 114 through which a line assembly 130 (e.g., see FIG. 4A) may be inserted through one or more of the links 110 to bias the links 110. In some embodiments, lines extending through line guides 114 within each of the links 110 may provide a biasing force to press the links 110 together during fixturing and as holding force along the bottom (e.g., bottom surface 113) of the links 110 for holding the insertion tool 100 in the tensioned state during operation. Generally, the line assembly 130 is configured to be tensioned to compress the plurality of links 110. In some embodiments, when the line assembly 130 is tensioned, the links 110 of the insertion tool 100 are compressed to a tensioned state forming a rigidized or semi-rigidized arc with a predetermined curvature. In some embodiments, the line assembly 130 may comprise a single line connected on two ends to the proximal end and looped through the distal end of the insertion tool 100 or two lines each attached to the distal end and the proximal end of the insertion tool 100.

In some embodiments, the links 110 each includes an indentation 121 and a protrusion 122 on opposite ends 124 and 126 of the link 110 near the bottom surface 113, opposite the flexible spine 120, together forming a stop feature. The indentation 121 is configured to engage the protrusion 122 of an adjacent link 110 when the insertion tool 100 moves from a free or bend state as shown in FIGS. 2A-C to a tensioned or closed state as shown in FIGS. 1A-C. In some embodiments, when tension is applied to the line assembly 130 to compress the links 110, the stop features counteract the force applied by the line assembly 130 to hold the insertion tool 100 in a predetermined shape. Generally, the stop features (indentation 121 and protrusion 122) limit the curvature of the insertion tool 100 and allow the shape formed by the fixturing process described with reference to FIGS. 4A, 4B, and 5 to be reproduced in free space. In some embodiments, a link 110 may include other recesses, protrusions, and openings for increasing structural strength, reducing weight, engaging with a drive mechanism, engaging with external guides, and/or providing access to the interior of the link 110.

It will be appreciated that the insertion tool 100 may be used in any compatible machine across different industries. While reference is made herein with respect to turbofan engines and gas turbine engines specifically, one of ordinary skill in the art will recognize that the inherent flexibility of the insertion tool 100 allows for inspection and maintenance in different industrial machines of varying sizes.

Figure 3A:
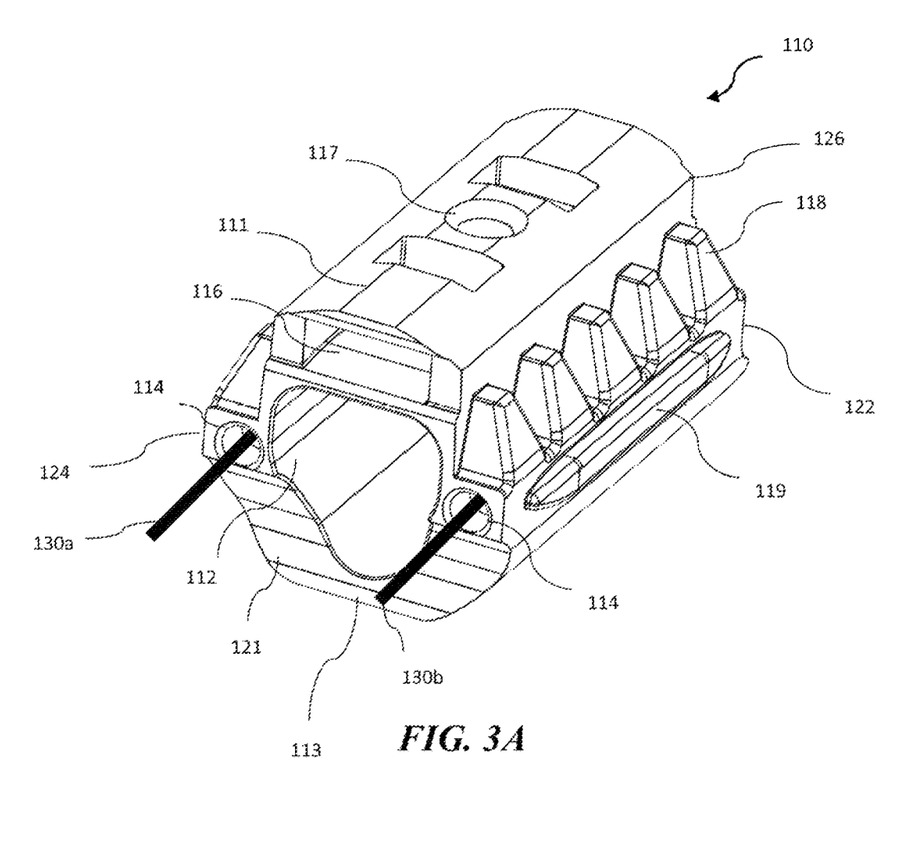
FIG. 3A is a top perspective view of a link according to some embodiments.
Figure 3B:
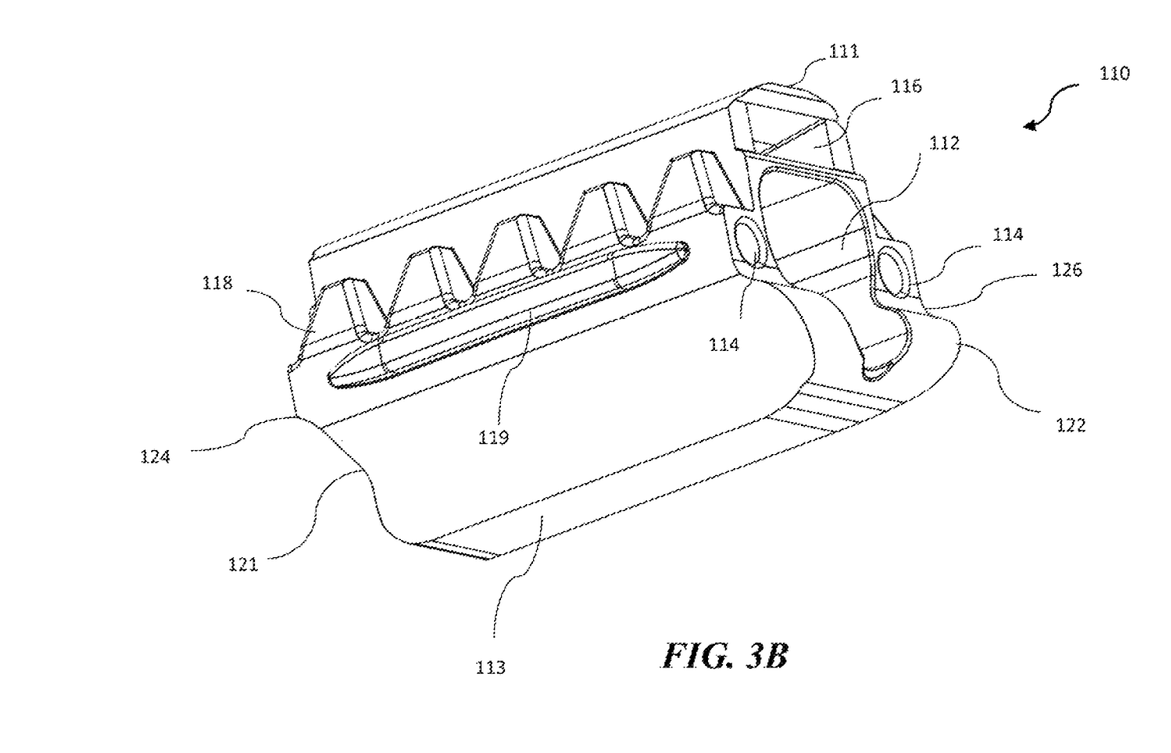
FIG. 3B is a bottom perspective view of the link of FIG. 3A according to some embodiments.

Referring now to FIGS. 3A and 3B, a link 110 of an insertion tool 100 according to some embodiments is shown. The link 110 includes a top surface 111 and a bottom surface 113. In some embodiments, when the insertion tool 100 is in the tensioned state such as shown in FIGS. 1A-C, the top surface 111 corresponds to the extended side and the bottom surface 113 corresponds to the compressed side of the insertion tool 100. In some embodiments, the bottom surface 113 and/or the top surface 111 of each of the plurality of links 110 comprises a rounded surface for aligning the links 110 during fixturing. The top surface 111 comprises an opening 117 to the spine slot 116 for affixing a flexible spine 120 inserted into the spine slot 116 to the link 110. In some embodiments, adhesive, screw, fastener, heat, light, etc. may be applied to a flexible spine 120 in the spine slot 116 via the opening 117 prior to or during the fixturing process described with reference to FIGS. 4A-B and 5. In some embodiments, the top surface 111 may comprise a plurality of openings to access the spine slot 116 and/or the inserted flexible spine 120. In some embodiments, the opening 117 for affixing a flexible spine 120 may be centered, off-centered, or side-facing.

The spine slot 116 is located beneath the top surface 111 and configured to receive a flexible spine 120 inserted through the ends 124 and 126 of the link 110. In some embodiments, the spine slot 116 is narrower at or near the center and wider towards the ends of the link 110 to allow flex of the affixed flexible spine 120 within the spine slot 116. In some embodiments, the flexible spine 120 may only be secured to the link 110 at or near the center of the spine slot 116 as shown in FIGS. 1B and 2B. In some embodiments, the spine slot 116 may be omitted, and the flexible spine 120 may instead be affixed to the top surface 111 or a wall of the core 112 with a slot structure.

The core 112 is configured to support and enable the operation of a wide variety of service and/or inspection tool implements through the links 110. In some embodiments, the core 112 may be separated into multiple openings of various sizes and shapes depending on the application. The line guides 114 are each configured to receive a line 130a, 130b of a line assembly 130 for biasing the link 110 of an insertion tool 100. In some embodiments, the line is inserted through but not attached to the line guides 114.

In some embodiments, the sides of a link 110 may further include a plurality of drive features 118 configured to engage a gear rack for driving the movement of the insertion tool 100 and wing protrusions 119 for engaging with a tool guide to ensure the tool stays on track during operation. In some embodiments, the drive features 118 and/or the wing protrusions 119 may be used to align the links 110 during the fixturing process.

In some embodiments, a link 110 of an insertion tool 100 may omit one or more features described with references to FIGS. 3A-B, such as the spine slot 116, the core 112, the drive feature 118, and the wing protrusion 119.

Figure 4A:
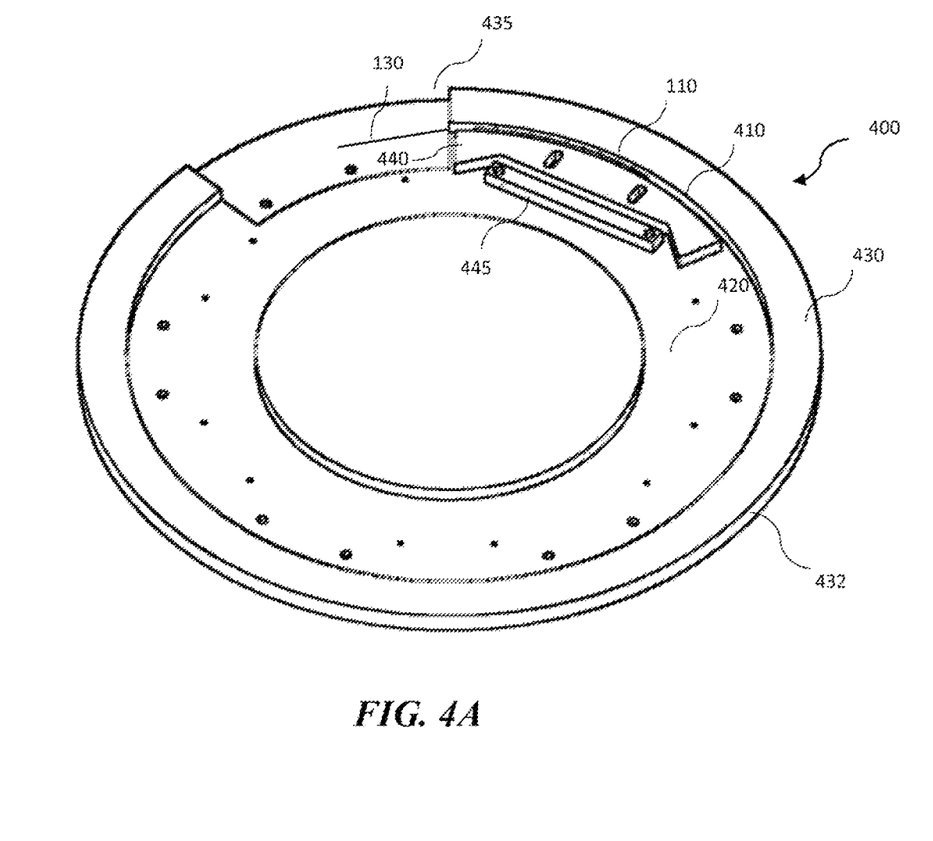
FIG. 4A is a perspective view of a fixturing assembly according to some embodiments.
Figure 4B:
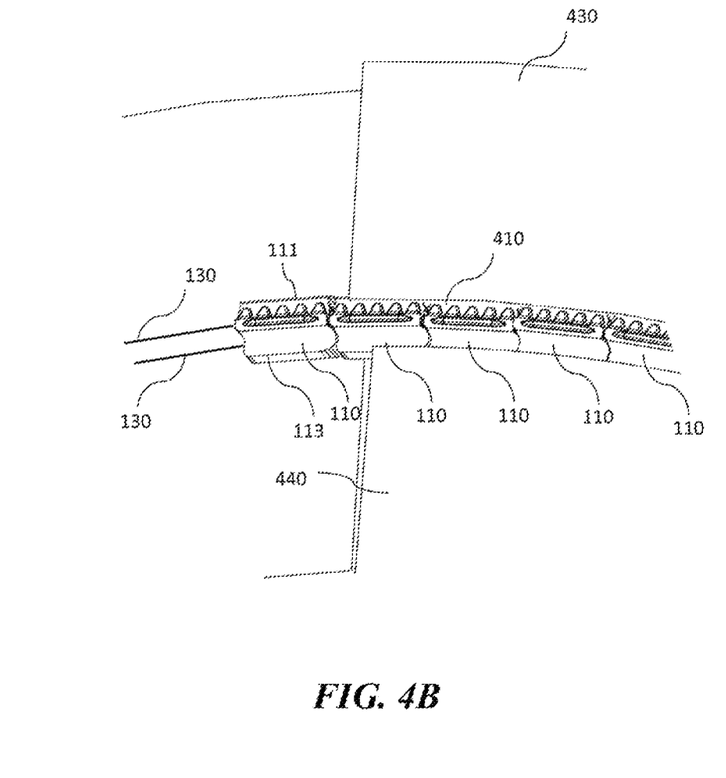
FIG. 4B is a close-up view of links in the fixturing assembly of FIG. 4A according to some embodiments.

Referring now to FIGS. 4A and 4B, a fixturing assembly 400 for forming and shaping an insertion tool 100 according to some embodiments is shown. The fixturing assembly 400 includes a channel 410 with a specified predefined curvature. The channel 410 is defined by an outer ring 430 of a base 420 and inner ring 440 removably attached to the base 420. The inner ring 440 is actuatable by a clamp actuator 445 to affect the width of the channel 410. In some embodiments, the outer ring 430 comprises a fixed wall of the channel 410 and the inner ring 440 comprises a moveable clamp of the channel 410. In some embodiments, the channel 410 may instead be defined by a fixed inner ring and a movable outer ring. In some embodiments, the inner ring 440 may be of any length up to the length of the outer ring 430. In some embodiments, the inner ring 440 may comprise a plurality of segments that together forms the length of the channel 410. In some embodiments, segments of the inner ring 440 may be added or removed from the base 420 based on the desired length of the insertion tool 100 being formed. In some embodiments, the channel 410 is an open channel and the links 110 may be dropped into the channel from the top. In some embodiments, the channel 410 may comprise a tube, and the links 110 may be inserted through one or both ends of the tub.

During fixturing, links 110 for forming an insertion tool 100 are placed in the channel 410. In some embodiments, the channel 410 is curved and the links 110 are placed into the channel 410 with the bottom surface 113 facing the side of the channel 410 having a smaller diameter (e.g., inner ring 440) and the top surface 111 (e.g., near a spine slot 116) facing the side of the channel 410 having a larger diameter (e.g., outer ring 430). When pressure is applied to the links 110 via the moveable clamp (e.g., inner ring 440) of the channel 410, the links 110 are shaped to rotate to a position that radially aligns the links 110 within the channel 410. In some embodiments, the surfaces of the channel 410 that contacts the links 110 have friction coefficients of less than 0.3 such that the links 110 may easily slide and rotate to align when tension and/or pressure is applied to the links 110.

In some embodiments, tension is applied to the links 110 in the channel 410 via a line assembly 130 including one or more lines inserted through line guides 114 of the links 110. A tension controller (not shown) may be positioned at an outer ring opening 435 of the channel 410 to pull the line assembly 130 to apply tension to the links 110. In some embodiments, the applied tension may match the force applied by the line assembly 130 when the fixtured insertion tool 100 is in the tensioned state in free space.

In some embodiments, the links 110 are affixed to a flexible spine 120 when the links 110 have been radially aligned and while tension is applied to push the links 110 together in the channel 410. In some embodiments, a wall of the channel 410 (e.g., as defined by outer ring 430) comprises one or more openings 432 for accessing the links 110 placed in the channel 410 for affixing the links 110 to the flexible spine 120 inside the channel 410 while the links 110 are aligned and tensioned in the channel 410. In some embodiments, an adhesive material may be applied to affix the flexible spine 120 to the link 110, and tension may be applied to hold the links 110 in place until the adhesive material fully dries or cures. In some embodiments, the flexible spine 120 may be affixed to the links 110 via bonding, welding, heat staking, fasteners (e.g. pins, screws), snap fits, over-molding, brazing, shrink fits, and the like. In some embodiments, the fixturing assembly 400 may be used in the method described with reference to FIG. 5.

In some embodiments, in addition to or in place of a movable clamp, the channel 410 may include one or more grooves that engage protrusions such as the wing protrusions 119 and the drive features 118 on the links 110 to radially align the links 110 placed into the channel 410. In some embodiments, the channel 410 may comprise a tub, and the links 110 may be inserted through one or both ends of the tub.

Figure 5:
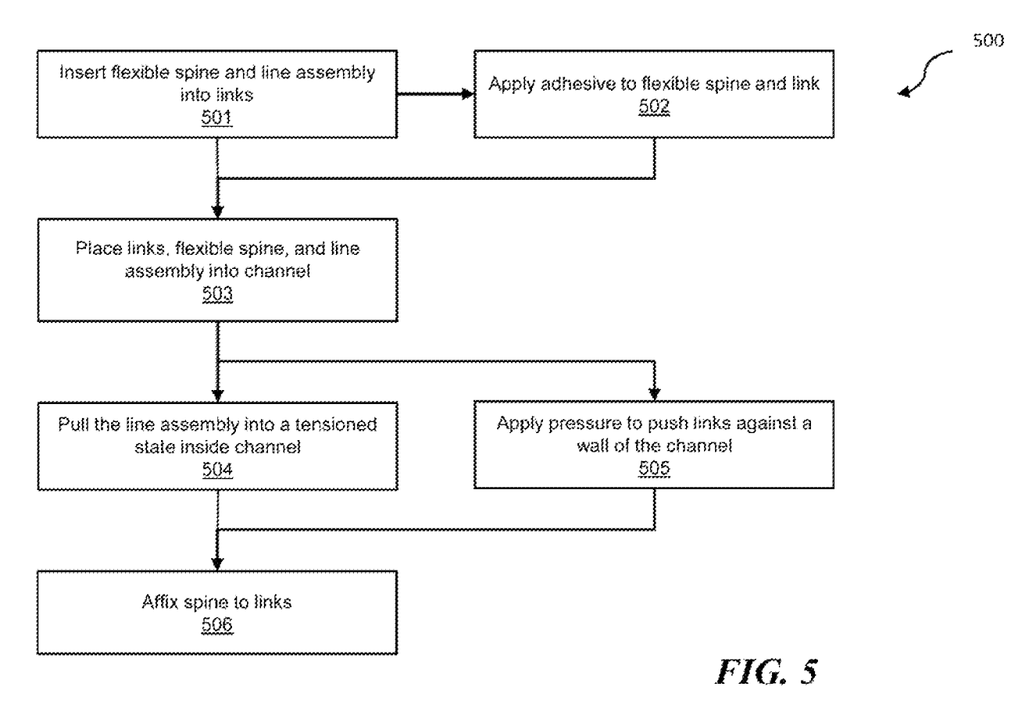
FIG. 5 illustrates a flow diagram of a method for forming an insertion tool according to some embodiments.

Referring now to FIG. 5, an exemplary method 500 is illustrated for forming an insertion tool 100 with a plurality of links 110 and a flexible spine 120.

At step 501, a flexible spine 120 and a line assembly 130 are inserted into a sequence of links 110. In some embodiments, each link 110 may include a spine slot 116 and one or more line guides 114. In some embodiments, the flexible spine 120 may comprise a continuous single material or a plurality of segments. In some embodiments, spine slots 116 may be absent in the links 110 and the flexible spine 120 may instead be placed adjacent to the links 110 in a channel 410 of a fixturing assembly 400. In some embodiments, step 501 may occur after step 503 and/or step 505. For example, the links 110 may be placed in the channel 410 and aligned prior to the flexible spine 120 and/or the line assembly 130 being inserted through the links 110.

At step 502, an adhesive material is optionally applied to the flexible spine 120 and the links 110 before the links 110 are placed into the channel 410. In some embodiments, an adhesive may be deposited via the opening 117 on the top surface 111 of each link 110. In some embodiments, the links 110 with the adhesive material are placed into the channel 410 prior to the adhesive being fully cured such that the flexible spine 120 may still move and slide relative to the links 110 in steps 503, 504, and 505. In some embodiments, step 502 may be omitted for embodiments using other means of affixing the flexible spine 120 to the links 110.

At step 503, the links 110, the flexible spine 120, and the line assembly 130 are placed into a channel 410 of a fixturing assembly 400. In some embodiments, the channel 410 is curved and the links 110 are placed into the channel 410 with the bottom surface 113 contacting a side of the channel 410 having the smaller diameter. In some embodiments, at step 501, the links 110 are not yet pushed against each other or fully aligned radially. In some embodiments, the channel 410 of the fixturing assembly 400 includes one or more moveable clamps (e.g., clamp actuator 445 and inner ring 440) and a fixed wall (e.g., outer ring 430). In some embodiments, the channel 410 includes one or more grooves that engage wing protrusions 119 and/or drive features 118 on the plurality of links 110 to align the links 110 placed into the channel 410.

In step 504, the line assembly 130 applies tension to pull the links 110 against each other into a tensioned state in the channel 410. In some embodiments, in a tensioned state, the stop features (e.g. protrusion 122 and indentation 121) of adjacent links 110 engage each other. In some embodiments, the line assembly 130 is pulled until the links 110 stop moving in response to further tension. In some embodiments, the force applied through the line assembly 130 is the same or proximately the same as the force applied to the links 110 by the line assembly 130 to move the insertion tool 100 into a tensioned state while in free space after the insertion tool 100 is fixtured.

In step 505, pressure is applied to the links 110 to push the links 110 against a wall of the channel 410. In some embodiments, a clamp formed by the inner ring 440 of the fixturing assembly 400 applies force via the bottom surface 113 of the links 110 to push the top surface 111 of the links 110 against the outer ring 430. In some embodiments, the clamp may instead be formed by a portion of the outer ring 430 to push the links 110 against the inner ring 440. In some embodiments, the bottom surface 113 and/or the top surface 111 of each of the links 110 include a rounded surface configured to rotate and align the links 110 when pressure is applied to the top and/or bottom surfaces 111, 113 of the links 110 in the channel 410. In some embodiments, step 505 may be omitted in embodiments where the channel 410 includes one or more grooves for engaging wing protrusions 119 on the sides of the links 110 for alignment.

In step 506, the flexible spine 120 is affixed to the links 110 while the links 110 are tensioned and aligned in the channel 410. In some embodiments, the flexible spine 120 is affixed to the links 110 through adhesives, bonding, welding, screws, rivets, crimping, encapsulation within one or more bodies, over-molding, brazing, shrink fits, heating staking, fastening, and/or snap fits. In some embodiments, means for affixing such as fastener, adhesive, heat for welding, or UV light for curing may be applied to the flexible spine 120 via openings (e.g., openings 117) on a wall of the channel 410 of the fixturing assembly 400 contacting the top surfaces 111 of the links 110. After step 506, the links 110, the flexible spine 120, and the line assembly 130 form a fixtured insertion tool 100 configured to be actuated from a free state to a tensioned state, where the tensioned state reproduces to the curvature defined by the channel 410 of the fixturing assembly 400. In some embodiments, in the free state, the insertion tool 100 may take a variety of shapes based on external forces such as gravity and contact with external surfaces.

Figure 6A:
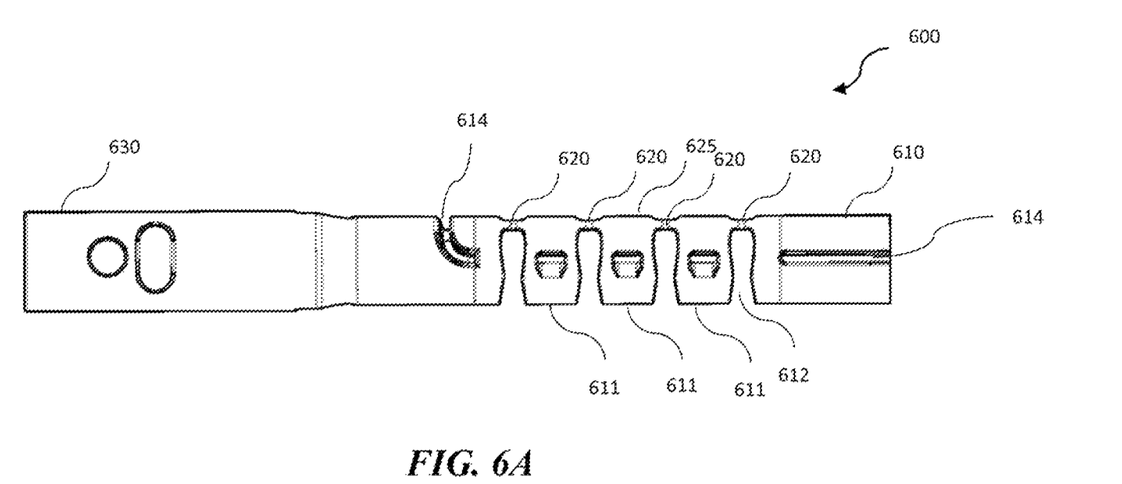
FIGS. 6A and 6B are side views of an insertion tool with an integrated spine according to some embodiments.
Figure 6B:
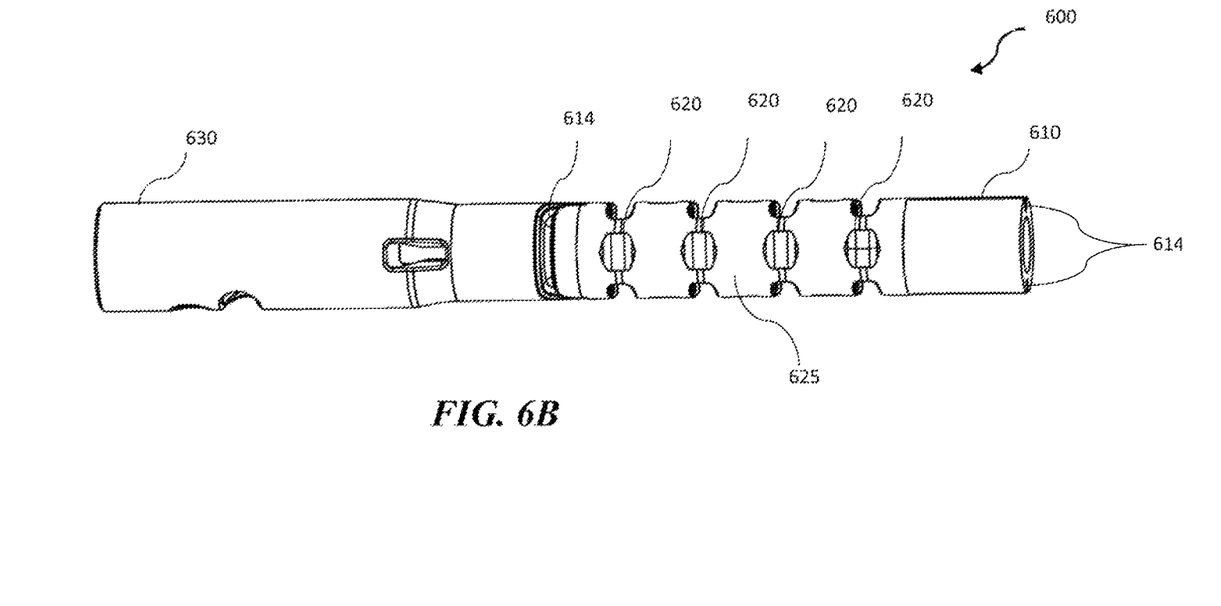

Referring now to FIGS. 6A and 6B, an insertion tool 600 with an integrated spine according to some embodiments is shown. The insertion tool 600 includes a distal end 630 configured to hold a tool and a proximal end 610 that may be fixed to a base for controlling the insertion tool 600. Links 611 are formed by openings 612 on the body 625 of the insertion tool 600 between the ends 610, 630 and the connecting material between the links 611 forms a flexible spine 620. The links 611 are each shaped such that when tension is applied and the stop features of the links come in contact with each other, a predefined curvature is achieved. In some embodiments, the insertion tool 600 may be formed as a single piece of plastic and/or may be additively manufactured. The additive manufacturing process may form the shapes of the individual links based on the desired curvature. The insertion tool 600 further includes a line guide 614 for inserting a line assembly (e.g., line assembly 130) for actuating the links 611 from a free state to a tensioned state.

All of the features disclosed in this specification (including any accompanying claims, abstract and drawings), and/or all of the steps of any method or process so disclosed, may be combined in any combination, except combinations where at least some of such features and/or steps are mutually exclusive.

Further aspects of the disclosure are provided by the subject matter of the following clauses:

A method of forming an insertion tool comprises placing a plurality of links, a flexible spine, and a line assembly into a channel of a fixturing assembly, the line assembly being inserted through line guides in each of the plurality of links; pulling, via the line assembly, the plurality of links in into a tensioned state in the channel; and affixing the flexible spine to each of the plurality of links while in the tensioned state.

The method of any proceeding clause further comprising applying, with the fixturing assembly, pressure to the plurality of links to push the plurality of links against a wall of the channel to radially align the plurality of links.

The method of any preceding clause wherein at least one of a bottom surface and a top surface of each of the plurality of links comprises a rounded surface configured to align the plurality of links when pressure is applied in the channel.

The method of any preceding clause wherein the channel is curved and the plurality of links are placed into the channel with the bottom surface facing a side of the channel having a smaller diameter The method of any preceding clause wherein the channel of the fixturing assembly comprises one or more moveable clamps and a fixed wall.

The method of any preceding clause wherein the channel comprises a groove that engages protrusions on the plurality of links to align the plurality of links placed into the channel.

The method of any preceding clause wherein one or more surfaces of the channel that contacts the plurality of links have friction coefficients of less than 0.3.

The method of any preceding clause wherein a wall of the channel comprises one or more openings for accessing the plurality of links placed in the channel for affixing the plurality of links to the flexible spine.

The method of any preceding clause wherein the flexible spine is affixed to the plurality of links through at least one of adhesive, bonding, welding, screws, rivets, crimping, encapsulation within one or more bodies, over-molding, brazing, shrink fits, heating staking, fasteners, and snap fits.

The method of any preceding clause further comprising applying an adhesive material to the flexible spine before placing the plurality of links into the channel and wherein affixing the flexible spine comprises curing the adhesive material on the flexible spine.

The method of any preceding clause wherein each of the plurality of links comprises an opening on a surface contacting a wall of the channel, wherein the flexible spine is affixed to each of the plurality of links via the opening.

The method of any preceding clause wherein each of the plurality of links comprises a spine slot through which the flexible spine is inserted.

An insertion tool apparatus comprises a plurality of links arranged in a sequence; a flexible spine affixed to the plurality of links; and a line assembly inserted through line guides in each of the plurality of links, the line assembly being configured to actuate the plurality of links from a free state to a tensioned state.

The apparatus of any preceding clause wherein each of the plurality of links comprises a spine slot through which the flexible spine is inserted.

The apparatus of any preceding clause wherein the spine slot of a link of the plurality of links is narrower at a center and wider at two ends.

The apparatus of any preceding clause wherein a top surface of a link of the plurality of links comprises an opening through which the flexible spine in the spine slot is affixed to the link.

The apparatus of any preceding clause wherein the flexible spine is affixed to the plurality of links through adhesives, bonding, welding, screws, rivets, crimping, encapsulation within one or more bodies, over-molding, brazing, shrink fits, heating staking, fasteners, or snap fits.

The apparatus of any preceding clause wherein each of the plurality of links comprises an indentation on a first end and a protrusion on a second end, and the indentation is configured to engage the protrusion of an adjacent link when the plurality of links are in the tensioned state.

The apparatus of any preceding clause wherein sides of each of the plurality of links comprise a protrusion configured to engage with a tool guide and/or a channel of a fixturing assembly.

An insertion tool apparatus comprises a line assembly and an additively manufactured body having a distal end, a links portion, and a proximal end. The links portion of the body having a plurality of openings that define a plurality of links and connecting material forming a flexible spine connecting each of the plurality of link in sequence. The line assembly being configured to actuate the plurality of links from a free state to a tensioned state.

The apparatus of any preceding clause wherein each of the plurality of links comprises an indentation on a first end and a protrusion on a second end, and the indentation is configured to engage the protrusion of an adjacent link when the plurality of links are in the tensioned state.

The apparatus of any preceding clause wherein sides of each of the plurality of links comprise a protrusion configured to engage with a tool guide and/or a channel of a fixturing assembly.

The apparatus of any preceding clause wherein the proximal end and the plurality links comprise openings that form a line guide through which the line assembly is inserted.

A method for forming an insertion tool comprises additively manufacture, based on a computer model, a body of an insertion tool having a distal end, a links portion, and a proximal end. The links portion of the body having a plurality of openings that define a plurality of links and connecting material forming a flexible spine connecting each of the plurality of link in sequence. The method further comprises inserting a line assembly into the body, the line assembly being configured to actuate the plurality of links from a free state to a tensioned state.

The method of any preceding clause wherein a bottom surface of each of the plurality of links formed by additive manufacturing comprises an indentation on a first end and a protrusion on a second end, and the indentation is configured to engage the protrusion of an adjacent link when the plurality of links are in the tensioned state.

The method of any preceding clause wherein sides of each of the plurality of links formed by additive manufacturing comprise a protrusion configured to engage with a tool guide and/or a channel of a fixturing assembly.

The method of any preceding clause wherein the proximal end and the plurality links formed by additive manufacturing comprise openings that form a line guide through which the line assembly is inserted.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of forming an insertion tool comprising:
   placing a plurality of links, a flexible spine, and a line assembly into a channel of a fixturing assembly, the line assembly being inserted through line guides in each of the plurality of links;
   pulling, via the line assembly, the plurality of links in into a tensioned state in the channel; and
   affixing the flexible spine to each of the plurality of links while in the tensioned state, the flexible spine being continuous and connects the plurality of links.

2. The method of claim 1, further comprising:
   applying, with the fixturing assembly, pressure to the plurality of links to push the plurality of links against a wall of the channel to radially align the plurality of links.

3. The method of claim 2, wherein at least one of a bottom surface and a top surface of each of the plurality of links comprises a rounded surface configured to align the plurality of links when pressure is applied in the channel.

4. The method of claim 3, wherein the channel is curved and the plurality of links are placed into the channel with the bottom surface facing a side of the channel having a smaller diameter.

5. The method of claim 1, wherein the channel of the fixturing assembly comprises one or more moveable clamps and a fixed wall.

6. The method of claim 1, wherein a wall of the channel comprises one or more openings for accessing the plurality of links placed in the channel for affixing the plurality of links to the flexible spine.

7. The method of claim 1, wherein each of the plurality of links comprises an opening on a surface contacting a wall of the channel, wherein the flexible spine is affixed to each of the plurality of links via the opening.

8. The method of claim 1, wherein each of the plurality of links comprises a spine slot through which the flexible spine is inserted.

9. An insertion tool apparatus comprising:
   a plurality of links arranged in a sequence;
   a flexible spine affixed to the plurality of links; and
   a line assembly inserted through line guides in each of the plurality of links, the line assembly being configured to actuate the plurality of links from a free state to a tensioned state;
   wherein each of the plurality of links comprises a spine slot through which the flexible spine is inserted; and
   wherein a top surface of a link of the plurality of links comprises an opening through which the flexible spine in the spine slot is affixed to the link.

10. The apparatus of claim 9, wherein the spine slot of a link of the plurality of links is narrower at a center and wider at two ends.

11. The apparatus of claim 9, wherein the flexible spine is affixed to the plurality of links through adhesives, bonding, welding, screws, rivets, crimping, encapsulation within one or more bodies, over-molding, brazing, shrink fits, heating staking, fasteners, or snap fits.

12. The apparatus of claim 9, wherein each of the plurality of links comprises an indentation on a first end and a protrusion on a second end, and the indentation is configured to engage the protrusion of an adjacent link when the plurality of links are in the tensioned state.

13. The apparatus of claim 9, wherein sides of each of the plurality of links comprise a protrusion configured to engage with a tool guide and/or a channel of a fixturing assembly.

14. The apparatus of claim 9, wherein the flexible spine is inserted through each of the plurality of links of the insertion tool apparatus.

15. A method of forming an insertion tool comprising:
placing a plurality of links, a flexible spine, and a line assembly into a channel of a fixturing assembly, the line assembly being inserted through line guides in each of the plurality of links;
pulling, via the line assembly, the plurality of links in into a tensioned state in the channel; and
affixing the flexible spine to each of the plurality of links while in the tensioned state;
wherein the channel comprises a groove that engages protrusions on the plurality of links to align the plurality of links placed into the channel.

16. A method of forming an insertion tool comprising:
placing a plurality of links, a flexible spine, and a line assembly into a channel of a fixturing assembly, the line assembly being inserted through line guides in each of the plurality of links;
pulling, via the line assembly, the plurality of links in into a tensioned state in the channel; and
affixing the flexible spine to each of the plurality of links while in the tensioned state;
wherein one or more surfaces of the channel that contacts the plurality of links have friction coefficients of less than 0.3.

17. A method of forming an insertion tool comprising:
placing a plurality of links, a flexible spine, and a line assembly into a channel of a fixturing assembly, the line assembly being inserted through line guides in each of the plurality of links;
pulling, via the line assembly, the plurality of links in into a tensioned state in the channel; and
affixing the flexible spine to each of the plurality of links while in the tensioned state;
wherein the flexible spine is affixed to the plurality of links through at least one of adhesive, bonding, welding, screws, rivets, crimping, encapsulation within one or more bodies, over-molding, brazing, shrink fits, heating staking, fasteners, and snap fits.

18. A method of forming an insertion tool comprising:
applying an adhesive material to a flexible spine;
placing a plurality of links with the adhesive material, a flexible spine, and a line assembly into a channel of a fixturing assembly, the line assembly being inserted through line guides in each of the plurality of links;
pulling, via the line assembly, the plurality of links in into a tensioned state in the channel; and
affixing the flexible spine to each of the plurality of links while in the tensioned state;
wherein affixing the flexible spine comprises curing the adhesive material on the flexible spine.

19. An insertion tool apparatus comprising:
a plurality of links arranged in a sequence;
a flexible spine affixed to the plurality of links; and
a line assembly inserted through line guides in each of the plurality of links, the line assembly being configured to actuate the plurality of links from a free state to a tensioned state;
wherein each of the plurality of links comprises a spine slot through which the flexible spine is inserted; and
wherein the spine slot of a link of the plurality of links is narrower at a center and wider at two ends.

20. An insertion tool apparatus comprising:
a plurality of links arranged in a sequence;
a flexible spine affixed to the plurality of links; and
a line assembly inserted through line guides in each of the plurality of links, the line assembly being configured to actuate the plurality of links from a free state to a tensioned state;
wherein the flexible spine is affixed to the plurality of links through adhesives, bonding, welding, screws, rivets, crimping, encapsulation within one or more bodies, over-molding, brazing, shrink fits, heating staking, fasteners, or snap fits.

* * * * *